United States Patent
Oriani

(10) Patent No.: US 7,989,547 B2
(45) Date of Patent: Aug. 2, 2011

(54) FLUOROELASTOMER COMPOSITION CONTAINING PROCESS AID

(75) Inventor: Steven R. Oriani, Landenberg, PA (US)

(73) Assignee: DuPont Performances Elastomers LLC., Wilmington, DE (US)

( * ) Notice: Subject to any disclaimer, the term of this patent is extended or adjusted under 35 U.S.C. 154(b) by 250 days.

(21) Appl. No.: 12/473,414

(22) Filed: May 28, 2009

(65) Prior Publication Data

US 2010/0016511 A1 Jan. 21, 2010

Related U.S. Application Data

(60) Provisional application No. 61/135,051, filed on Jul. 16, 2008.

(51) Int. Cl.
*C08L 27/12* (2006.01)

(52) U.S. Cl. .......................... 525/104; 525/236; 525/100

(58) Field of Classification Search .................. 525/104
See application file for complete search history.

(56) References Cited

U.S. PATENT DOCUMENTS

| | | | |
|---|---|---|---|
| 5,157,445 A | 10/1992 | Shoji et al. | |
| 5,340,679 A * | 8/1994 | Badesha et al. | 430/125.33 |
| 5,854,342 A | 12/1998 | Kirochko et al. | |
| 6,586,100 B1 | 7/2003 | Pickering et al. | |
| 6,664,336 B1 * | 12/2003 | Tomihashi et al. | 525/199 |
| 7,087,305 B2 | 8/2006 | Chen et al. | |
| 2006/0173131 A1 | 8/2006 | Morikawa et al. | |
| 2006/0178494 A1 * | 8/2006 | Pabon et al. | 528/25 |

FOREIGN PATENT DOCUMENTS

EP 0544265 B1 6/1993

* cited by examiner

*Primary Examiner* — Marc S Zimmer
*Assistant Examiner* — Lindsay Nelson

(57) ABSTRACT

Polyhydroxy curable fluoroelastomer compositions contain at least one process aid that is an aminosilicone having only a single primary amine group per polysiloxane molecule.

7 Claims, No Drawings

FLUOROELASTOMER COMPOSITION CONTAINING PROCESS AID

CROSS-REFERENCE TO RELATED APPLICATIONS

This application claims the benefit of U.S. Provisional Application No. 61/135,051 filed Jul. 16, 2008.

FIELD OF THE INVENTION

This invention relates to curable compositions of fluoroelastomers containing at least one process aid, more particularly to polyhydroxy curable fluoroelastomer compositions containing at least one aminosilicone process aid.

BACKGROUND OF THE INVENTION

Fluoroelastomers are well known in the art. Many are copolymers of vinylidene fluoride ($VF_2$) with at least one other fluorinated comonomer such as hexafluoropropylene (HFP), tetrafluoroethylene (TFE), or a perfluoro(alkyl vinyl ether). Other fluoroelastomers include copolymers of tetrafluoroethylene with a hydrocarbon olefin such as ethylene or propylene and copolymers of tetrafluoroethylene with a perfluoro(alkyl vinyl ether).

Fluoroelastomeric compositions can be molded into articles having excellent resistance to aggressive chemicals and high temperatures. They have the disadvantage, however, that compared with other heat resistant elastomers such as silicones, fluoroelastomeric compositions demonstrate relatively poor processability in terms of ease of mixing, ease of molding/demolding and flow during injection molding processes.

To provide better processability, processing aids are usually added to fluoroelastomeric compositions. Commonly used processing aids migrate to the surface during processing and it is generally believed that the processing advantage is provided at the interface between the fluoroelastomeric composition and the metal surfaces of the process equipment, e.g., the mill rolls, extruder screw and barrel, or mold cavities and runners. While these processing aids provide processing advantages in the short term, they eventually result in a deposit at the mold surface which is usually termed mould fouling and eventually causes processing difficulties. The surface deposit promotes adhesion between molded components and the mold surface and impairs demolding. It also results in surface defects on molded components such as knit lines. The only remedy is to clean the mold surface at regular intervals which results in a loss of productivity. These processing aids can also interfere with bonding performance, in the case of components having metal bonded inserts, and interfere with the physical properties of molded components, e.g. resulting in increased compression set resistance and lower heat resistance.

Examples of such processing aids include hydrocarbon waxes, natural vegetable waxes, fatty acid esters, mono-functional hydrocarbon amines (e.g., octadecyl amine), organosilicones, and long chain alcohols.

It is an object of the present invention to provide a curable fluoroelastomer composition having various advantages to prior art compositions, including:—improved compound mixing due to improved mill release (in the case of mill mixing) or rotor release (in the case of internal mixing);— improved processing during molding (injection or compression) defined by an easier flow in the mold, a better mold release (less tendency to stick in the mold), a lower level of mold fouling and hence a reduced frequency of mold cleaning; and—improvement in the physical properties of cured and postcured compositions, e.g. lower compression set.

SUMMARY OF THE INVENTION

It has been surprisingly discovered that certain aminosilicone fluids may be employed as process aids in polyhydroxy curable fluoroelastomer compositions to improve processability without adversely affecting physical properties of the cured compositions. The aminosilicone fluids are characterized by having only a single primary amine group per polysiloxane molecule so that they cannot crosslink the fluoroelastomer.

Accordingly, an aspect of the present invention is a polyhydroxy curable fluoroelastomer composition comprising:
A) fluoroelastomer;
B) 0.05 to 10 parts by weight, per 100 parts by weight fluoroelastomer, of an aminosilicone fluid having a single primary amine group per polysiloxane molecule:
C) 0.1 to 20 parts by weight, per 100 parts by weight fluoroelastomer, of a polyhydroxy curative;
D) 0.1 to 10 parts by weight, per 100 parts by weight fluoroelastomer, of a cure accelerator; and
E) 0.5 to 30 parts by weight, per 100 parts by weight fluoroelastomer, of an acid acceptor.

DETAILED DESCRIPTION OF THE INVENTION

The present invention is directed to polyhydroxy curable fluoroelastomer compositions that process well (i.e. mix well and mold well) while maintaining good physical properties in molded articles made therefrom.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoroethylene and optionally, tetrafluoroethylene; iii) tetrafluoroethylene with propylene and 3,3,3-trifluoropropene: and iv) ethylene with tetrafluoroethylene, perfluoro(methyl vinyl ether) and 3,3,3-trifluoropropylene.

Fluoroelastomers employed in this invention may also, optionally, comprise bromine, iodine or nitrile cure sites.

Curable compositions of the invention contain 0.05 to 10 (preferably 0.1 to 1.0) parts by weight, per 100 parts by weight fluoroelastomer, of an aminosilicone fluid having a single primary amine group per polysiloxane molecule. Suitable aminosilicone fluid process aids that may be employed in this invention are fluids at room temperature, i.e. at 20° C., and contain only a single primary amine per polysiloxane molecule. It is believed that the primary amine group on the process aid reacts with the fluoroelastomer (during processing or during polyhydroxy curing) so that the process aid becomes grafted to the fluoroelastomer. Each aminosilicone polymer chain may contain only a single primary amine group so that the process aid cannot crosslink the fluoroelastomer. Were the process aid to crosslink the fluoroelastomer, gelation would occur, increasing bulk viscosity, and thus degrading processability. In addition to a primary amine, the aminosilicone may, optionally, contain one or more secondary or tertiary amine groups. The latter react more slowly with fluoroelastomer than do primary amines, so that crosslinking and gelation is not an issue. Preferably the aminosilicone fluids employed in the invention do not contain silane or alkoxysilane functionality so that the silicone itself does not crosslink. Preferably the number average molecular weight (Mn), in Daltons, of the mono-functional aminosilicone is in the range of 500 to 50,000, more preferably in the range of 1000 to 10000.

Specific examples of aminosilicones that may be employed in the compositions of the invention include, but are not limited to

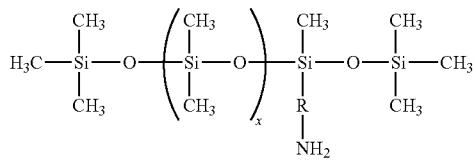

where the number average molecular weight is about 30,000, and R=—$C_3H_6$—NH—$C_2H_4$—, available from Genesee Polymers Corp., Burton, Mich. as GP-342, and where Mn is about 3300 and R=—$C_xH_{2x}$—, where $3 \leq n \leq 18$, available from Genesee Polymers Corp. as GP-956.

The curable compositions of the invention contain 0.1 to 20 parts by weight (preferably 1-5 parts) of polyhydroxy crosslinking agent (including derivatives thereof and salts) per 100 parts fluoroelastomer. Typical polyhydroxy crosslinking agents include di-, tri-, and tetrahydroxybenzenes, naphthalenes, and anthracenes, and bisphenols of the formula

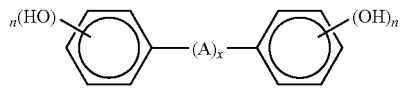

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxy-benzene) (i.e. "bisphenol AF" or "BPAF"); 4,4'-isopropylidene diphenol (i.e. "bisphenol A"); 4,4'-dihydroxydiphenyl sulfone; and 3,3'-diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, heptafluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

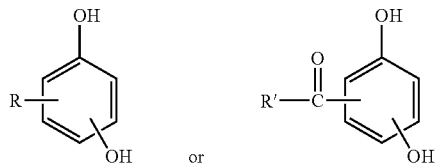

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone, 2,4-dihydroxybenzophenone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions, e.g. the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF. Quaternary ammonium and phosphonium salts of bisphenol anions are discussed in U.S. Pat. Nos. 4,957,975 and 5,648,429.

In addition, derivatized polyhydroxy compounds such as mono- or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

The curable compositions of the invention also contain between 0.5 to 30 parts by weight (preferably 0.7 to 10 parts) of an acid acceptor per 100 parts fluoroelastomer. The acid acceptor is typically a strong organic base such as Proton Sponge® (available from Aldrich) or an oxirane, or an inorganic base such as a metal oxide, metal hydroxide, or a mixture of 2 or more of the latter. Metal oxides or hydroxides which are useful acid acceptors include calcium hydroxide, magnesium oxide, lead oxide, zinc oxide and calcium oxide. Calcium hydroxide and magnesium oxide are preferred.

Curable compositions of the invention contain 0.1 to 10 (preferably 0.5 to 3) parts by weight per 100 parts fluoroelastomer of a vulcanization (or "cure") accelerator. These accelerators include tertiary sulfonium salts such as $[(C_6H_5)_2S^+(C_6H_{13})][Cl]^-$, and $[(C_6H_{13})_2S(C_6H_5)]^+[CH_3CO_2]^-$ and quaternary ammonium, phosphonium, and stibonium salts of the formula $R_5R_6R_7R_8Y^+X^-$, where Y is phosphorous, nitrogen, or antimony; $R_5$, $R_6$, $R_7$, and $R_8$ are individually $C_1$-$C_{20}$ alkyl, aryl, aralkyl, alkenyl, and the chlorine, fluorine, bromine, cyano, —OR, and —COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltri-phenylphosphonium chloride, benzyitriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo[5.4.0]undec-7-ene, and benzyldiphenyl(dimethylamino)phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenyl-phosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654.

Compositions of the invention may be made by blending the ingredients on a two-roll mill, an internal mixer such as Banbury® mixer, or other conventional equipment used for mixing elastomer compounds.

The polyhydroxy curable fluoroelastomer compositions of this invention have utility in end uses such as injection, compression, or transfer molded seals, o-rings, and gaskets, extruded tubing and hoses, extruded wire-coatings, coatings applied by solvent or flame spray processes, and others.

The invention is now illustrated by the following embodiments in which all parts are by weight unless otherwise indicated.

EXAMPLES

Test Methods

Physical properties of the compositions described in the examples were measured according to the following test procedures.

| | |
|---|---|
| Compression Set-B | ASTM D395 |
| Mooney Scorch | ASTM D1646 |

Example 1

In this example, the tendency of several silicone fluid process aids to crosslink a fluoroelastomer, in the absence of a polyhydroxy curative, was determined by measuring Mooney Scorch, according to the Test method. Compounds containing the ingredients listed in Table I were made by blending the ingredients in a Brabender® mixing bowl fitted with cam rotors, operating at 30 rpm with a temperature setpoint of 80° C. Results of the Mooney Scorch tests are also shown in Table I.

Samples 1 and 2, containing aminosilicones having only one primary amine per polysiloxane molecule, show little or no tendency to scorch as indicated by the small difference, or "delta" (0 to 0.2 Mooney units) between the final Mooney after 30 minutes at 149° C. and the minimum Mooney value recorded. These Mooney viscosity deltas are essentially the same as those of Control 1 and Control 5, which do not contain any primary amine groups. Thus, the single primary amine per polysiloxane molecule in aminosilicones GP-342 and GP-956 do not cause any crosslinking of the fluoroelastomer. Controls containing aminosilicones having more than one primary amine per polysiloxane molecule all exhibit a Mooney viscosity delta ranging from 1.2 up to 18 units, indicating crosslinking of the fluoroelastomer.

TABLE I

| Formulation, phr[1] | Control 1 | Control 2 | Control 3 | Sample 1 | Sample 2 | Control 4 | Control 5 | Control 6 | Control 7 | Control 8 |
|---|---|---|---|---|---|---|---|---|---|---|
| Viton ® A500[2] | 100 | 100 | 100 | 100 | 100 | 100 | 100 | 100 | 100 | 100 |
| Ca(OH)$_2$ HP-XL[3] | 6 | 6 | 6 | 6 | 6 | 6 | 6 | 6 | 6 | 6 |
| Elastomag 170[4] | 3 | 3 | 3 | 3 | 3 | 3 | 3 | 3 | 3 | 3 |
| BTPPC[5] | 0.25 | 0.25 | 0.25 | 0.25 | 0.25 | 0.25 | 025 | 0.25 | 0.25 | 0.25 |
| 2-8566[6] | 0 | 2 | 0 | 0 | 0 | 0 | 0 | 0 | 0 | 0 |
| 2-8630[7] | 0 | 0 | 2 | 0 | 0 | 0 | 0 | 0 | 0 | 0 |
| GP-342[8] | 0 | 0 | 0 | 2 | 0 | 0 | 0 | 0 | 0 | 0 |
| GP-956[8] | 0 | 0 | 0 | 0 | 2 | 0 | 0 | 0 | 0 | 0 |
| GP-654[9] | 0 | 0 | 0 | 0 | 0 | 2 | 0 | 0 | 0 | 0 |
| PDMS[10] | 0 | 0 | 0 | 0 | 0 | 0 | 2 | 0 | 0 | 0 |
| PDMS-bis-aminopropyl[11] | 0 | 0 | 0 | 0 | 0 | 0 | 0 | 2 | 0 | 0 |
| Silmer NH-di50[12] | 0 | 0 | 0 | 0 | 0 | 0 | 0 | 0 | 2 | 0 |
| Silamine AO EDA[12] | 0 | 0 | 0 | 0 | 0 | 0 | 0 | 0 | 0 | 2 |
| Mooney Scorch MS 121° C. (1 + 30) Minimum viscosity, M.U. | 37.1 | 43.6 | 41.5 | 37.3 | 33.9 | 39.6 | 36.8 | 38.0 | 48.2 | 52.9 |
| Mooney Scorch MS 121° C. (1 + 30) Final viscosity, M.U. | 37.5 | 47.6 | 42.7 | 37.5 | 33.9 | 44.1 | 37 | 39.5 | 66.2 | 70.9 |
| Viscosity delta, final − minimum, M.U. | 0.4 | 4.0 | 1.2 | 0.2 | 0 | 4.5 | 0.2 | 1.5 | 18.0 | 18.0 |
| Primary amine functionality | None | Poly | Poly | Mono | Mono | Poly | None | Poly | Poly | Poly |
| N content, % | None | 0.9 | 0.37 | 0.09 | 0.4 | 0.4 | 0 | 0.05 | * | * |

[1]phr is parts weight per hundred parts rubber (i.e. fluoroelastomer)
[2]a 60/40 wt. ratio copolymer of vinylidene fluoride and hexafluoropropylene, having a ML(1 + 10) @121° C. of 53, from DuPont Performance Elastomers L.L.C
[3]available from The Hallstar Co.
[4]MgO available from Akrochem Corp.
[5]benzyltriphenylphosphonium chloride
[6&7]aminosilicone having more than one primary amine per polysiloxane molecule, available from Dow Corning Corp.
[8]aminosilicone having one primary amine per polysiloxane molecule, available from Genesee Polymers Corp.
[9]aminosilicone having more than one primary amine per polysiloxane molecule, available from Geneses Polymers Corp.
[10]polydimethylsiloxane
[11]polydimethylsiloxane bis(3-aminopropyl) terminated, available from Sigma-Aldrich
[12]aminosilicone having more than one primary amine per polysiloxane molecule, available from Siltech Corp.
* unknown nitrogen content

Example 2

In this example, Mooney Scorch and compression set of compositions of the invention containing various amounts of aminosilicone process aid were compared to that of control compositions, absent process aid or containing octadecyl amine process aid. Compositions were made by blending the ingredients on a two-roll mill. The fluoroelastomer employed in this example was a 60/40 weight ratio copolymer of vinylidene fluoride and hexafluoropropylene having a ML (1+10)@121° C. of 34. Compositions (phr), Mooney Scorch data (MS 1+30, 149° C.) and compression set of O-rings are shown in Table II. O-rings were press cured at 177° C. for 10 minutes and then post cured at 232° C. for the times indicated in the Table. Compression set testing was conducted using conditions of 200° C. for 70 hours, 25% compression. The values reported are an average of three specimens. Compression set values of the cured compositions of the invention (Samples 2-4) were comparable to that of Control 9 that did not contain process aid. However, compression set of Control 10 (containing the octadecylamine process aid) was significantly worse (i.e. higher) than that of the cured compositions of the invention. Mooney Scorch data indicates that no premature crosslinking occurred in the samples of the invention (i.e. Sample 4 containing 1 phr aminosilicone had essentially the same final viscosity as Control 9, not containing a process aid).

TABLE II

| Formulation, phr | Control 9 | Sample 2 | Sample 3 | Sample 4 | Control 10 |
|---|---|---|---|---|---|
| Fluoroelastomer | 100 | 100 | 100 | 100 | 100 |
| VC50 Curative[1] | 2.14 | 2.14 | 2.14 | 2.14 | 2.14 |
| Bisphenol AF | 0.32 | 0.32 | 0.32 | 0.32 | 0.32 |
| Calcium Hydroxide HP-XL | 6 | 6 | 6 | 6 | 6 |
| Elastomag 170 | 3 | 3 | 3 | 3 | 3 |
| MT Black | 30 | 30 | 30 | 30 | 30 |
| Octadecyl amine | 0 | 0 | 0 | 0 | 1 |
| GP-956[2] | 0 | 0.25 | 0.5 | 1 | 0 |
| Mooney Scorch MS 149° C. (1 + 30) | | | | | |
| Initial viscosity, M.U. | 37.2 | * | * | 44.4 | * |
| Minimum viscosity, M.U. | 18.1 | * | * | 18 | * |
| Final viscosity, M.U. | 36 | * | * | 36.1 | * |
| Compression Set | | | | | |
| 0 hours post cure | 28.7 | 30.6 | 29.6 | 31.5 | 53.7 |
| 1 hour post cure | 18.7 | 18.5 | 19.4 | 20.6 | 41.7 |
| 24 hour post cure | 14 | 12.2 | 12.1 | 11.3 | 28.6 |

[1]a salt of benzyltriphenylphosphonium chloride reacted with bisphenol AF available from DuPont Performance Elastomers L.L.C
[2]an aminosilicone having only one primary amine group per polysiloxane molecule, available from Genesee Polymers Corp.
* not measured

Example 3

In this example, injection molding of a curable composition of the invention was conducted on a MIR molding machine having temperature setpoints of 90° C. (barrel) and 190° C. (die). Injection pressure was maintained at a constant 100 bar. The mold was a 40 cavity, chrome plated D-214 o-ring mold. The curable composition (Sample 5) was made by blending the fluoroelastomers and VC50 in a Banbury mixer operating at 50 rpm, dropped at 130° C. The bases, carbon black, and aminosilicone were then added on a two-roll mill. The ingredients and results are shown in Table III.

These results (short mold fill time and absence of knit lines) illustrate the excellent injection molding capabilities of the curable compositions of the invention.

TABLE III

| | Sample 5 |
|---|---|
| Formulation, phr | |
| A200[1] | 65 |
| A700[2] | 35 |
| VC50 Curative | 2.5 |
| Calcium hydroxide HP-XL | 6 |
| Elastomag 170 | 3 |
| MT black | 30 |
| GP-342 | 5 |
| Properties | |
| Injection molding fill time (seconds) | 7.6 |
| Knit lines present on o-rings | No |

[1]a 60/40 wt. ratio copolymer of vinylidene fluoride and hexafluoropropylene having a ML (1 + 10) @121° C. of 25, available from DuPont Performance Elastomers L.L.C
[2]a 60/40 wt. ratio copolymer of vinylidene fluoride and hexafluoropropylene having a ML (1 + 10) @121° C. of 72, available from DuPont Performance Elastomers L.L.C

What is claimed is:

1. A polyhydroxy curable fluoroelastomer composition comprising:
   A) fluoroelastomer;
   B) 0.05 to 10 parts by weight, per 100 parts by weight fluoroelastomer, of an aminosilicone fluid having a single primary amine group per polysiloxane molecule;
   C) 0.1 to 20 parts by weight, per 100 parts by weight fluoroelastomer, of a polyhydroxy curative;
   D) 0.1 to 10 parts by weight, per 100 parts by weight fluoroelastomer, of a cure accelerator; and
   E) 0.5 to 30 parts by weight, per 100 parts by weight fluoroelastomer, of an acid acceptor.

2. A polyhydroxy curable fluoroelastomer composition of claim 1 wherein said fluoroelastomer is selected from the group consisting of copolymers of i) vinylidene fluoride with hexafluoropropylene; ii) vinylidene fluoride with hexafluoropropylene and tetrafluoroethylene; iii) vinylidene fluoride with perfluoro(methyl vinyl ether) and 2-hydropentafluoroethylene; iv) vinylidene fluoride with perfluoro(methyl vinyl ether), 2-hydropentafluoroethylene and tetrafluoroethylene; v) tetrafluoroethylene with propylene and 3,3,3-trifluoropropene; and vi) ethylene with tetrafluoroethylene, perfluoro(methyl vinyl ether) and 3,3,3-trifluoropropylene.

3. A polyhydroxy curable fluoroelastomer composition of claim 1 wherein said amino silicone has a number average molecular weight between 500 and 50,000.

4. A polyhydroxy curable fluoroelastomer composition of claim 3 wherein said amino silicone has a number average molecular weight between 1000 and 10,000.

5. A polyhydroxy curable fluoroelastomer composition of claim 1 wherein said amino silicone is present at a level of 0.1 to 1 parts by weight, per 100 parts by weight fluoroelastomer.

6. A curable fluoroelastomer composition of claim 1 wherein said polyhydroxy curative is selected from the group consisting of i) dihydroxy-, trihydroxy-, and tetrahydroxy-benzenes, -naphthalenes, and -anthracenes;
   ii) bisphenols of the formula

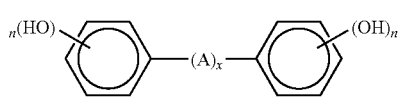

where A is a stable divalent radical; x is 0 or 1; and n is 1 or 2; iii) dialkali salts of said bisphenols, iv) quaternary ammonium salts of said bisphenols, v) quaternary phosphonium salts of said bisphenols, vi) tertiary sulfonium salts of said bisphenols, and vii) esters of said bisphenols.

7. A curable fluoroelastomer composition of claim 1 wherein said cure accelerator is chosen from the group consisting of quaternary ammonium salts, tertiary sulfonium salts and quaternary phosphonium salts.

* * * * *